United States Patent [19]

Ogawa et al.

[11] Patent Number: 5,070,496
[45] Date of Patent: Dec. 3, 1991

[54] LASER REPRODUCING APPARATUS

[75] Inventors: Hiroshi Ogawa; Hideyoshi Horimai, both of Tokyo, Japan

[73] Assignee: Sony Corporation, Tokyo, Japan

[21] Appl. No.: 290,412

[22] PCT Filed: Apr. 15, 1988

[86] PCT No.: PCT/JP88/00376
§ 371 Date: Dec. 12, 1988
§ 102(e) Date: Dec. 12, 1988

[87] PCT Pub. No.: WO88/08191
PCT Pub. Date: Oct. 20, 1988

[30] Foreign Application Priority Data

Apr. 15, 1987 [JP] Japan .................................. 62-92379

[51] Int. Cl.$^5$ .............................................. G11B 7/00
[52] U.S. Cl. ..................................... 369/116; 369/122; 250/205
[58] Field of Search .................. 369/116, 122; 250/205

[56] References Cited

U.S. PATENT DOCUMENTS

| | | | |
|---|---|---|---|
| 4,580,044 | 4/1986 | Hongo et al. | 369/116 |
| 4,692,606 | 9/1987 | Sakai et al. | 250/205 |
| 4,701,609 | 10/1987 | Koishi et al. | 369/116 |
| 4,754,460 | 1/1988 | Kimura et al. | 369/116 |
| 4,788,674 | 11/1988 | Maeda et al. | 369/116 |

FOREIGN PATENT DOCUMENTS 58-175146 10/1983 Japan .
60-243832 12/1985 Japan .

Primary Examiner—Roy N. Envall, Jr.
Assistant Examiner—Hindi Nabil
Attorney, Agent, or Firm—Philip M. Shaw, Jr.

[57] ABSTRACT

The present invention relates to a laser reproducing apparatus which reproduces recorded data recorded on a recording medium such as an optical disc, a magneto-optical disc or the like by the irradiation of a laser beam, in which the current value of a driving signal which drives a laser diode (12) is set near a value at which there is the least interference with the laser beam is by reflected-back light from the recording medium, and the irradiation by the laser beam from the laser diode (12) at the thus set current value is intermittently carried out at predetermined intervals. Also, the duration of lock pulse of this laser beam is selected to be a duration in which writing on the recording medium (11) cannot be carried out by the thus set current value. Thus, the influence exerted on the laser beam by the reflected-back light from the recording medium (11) is small so that the data can be reproduced satisfactorily. Also, the arrangement of the drive circuit for driving the laser diode (12) can be simplified.

13 Claims, 3 Drawing Sheets

LASER REPRODUCING APPARATUS

DESCRIPTION

1. Technical Field

The present invention relates to a laser reproducing apparatus that reproduces recorded data recorded on a recording medium such as an optical disc, a magneto-optical disc or the like by the irradiation of a laser beam.

2. Background Art

As data recording and reproducing means in which data is rewritable, there has been recently developed a magneto-optical disc.

Data recorded on this magneto-optical disc is reproduced therefrom by means of such a pickup as, for example, shown in FIG. 7. When the recorded data is reproduced from a magneto-optical disc 11 on which data were already recorded by virtue of the change of the magnetization direction, a laser beam emitted from a laser diode 12 is irradiated on the magneto-optical disc 11 through a collimator lens 13, a beam splitter 14 and an objective lens 15 and a reflected light from the magneto-optical disc 11 is again introduced into the beam splitter 14 through the objective lens 15, whereby the reflected 1 light is changed by the beam splitter 14. A portion of the thus reflected light is introduced through an analyzer 16 and a lens 17 into a light receiving element 18.

The condition of the magneto-optical disc 11 can be known by detecting the polarized state of the light incident on the light receiving element 18 so that the recorded data can be reproduced.

When the data is reproduced by using the pickup shown in FIG. 7, however, a so-called reflected-back light occurs, in which the laser beam from the laser diode 12 is reflected by the magneto-optical disc 11 and a part thereof is passed through the beam splitter 14 and is returned to the laser diode 12. This reflected-back light makes the oscillation mode of the laser diode 12 unstable, causing a waveform of the reproduced signal to be distorted. Also, there occurs a mode-hopping noise or the like in which a plurality of longitudinal modes concur, unstably, thus making it impossible to properly the data. Specifically, in the case of the above-mentioned optical system in which the outward and backward paths of the laser beam re changed by the beam splitter, as compared to an optical system in which a polarizing beam splitter is employed as a beam splitter and a ¼ wavelength plate is provided between this beam splitter and an objective lens, from a construction standpoint, the reflected-back light occurs frequently so that the waveform distortion of the reproduced signal, the mode-hopping noise and so on occur frequently.

To solve this problem, such a technique is proposed in Official Gazette of Japanese Patent Publication No. 59-9086 (published on Feb. 29, 1984) in which a high frequency signal of about 700 MHz is superimposed upon a laser drive signal supplied, for example, to a semiconductor laser and a multi-mode laser is outputted from this semiconductor laser thereby removing the influence caused by the reflected-back light. However, since a circuit for superimposing a high frequency signal requires a signal of a relatively large power, the arrangement thereof is complicated. Also, this circuit cannot be matched with the laser diode in impedance without difficulty so that the mode-hopping noise and waveform distortion cannot be sufficiently removed.

DISCLOSURE OF INVENTION

In view of the above-mentioned aspect, the present invention is to provide a laser reproducing apparatus of simple arrangement which can reproduce data satisfactorily, without the problems of the reflected back light.

A laser reproducing apparatus of the present invention is constructed as, for example, shown in FIG. 1. In this laser reproducing apparatus which reproduces data recorded on a recording medium by the irradiation of a laser beam emitted from a laser diode 12, the current value of a drive signal of the laser diode 12 is set near a value at which the irradiated state of the laser beam is changed the least by the reflected-back light. The irradiation of the laser beam from the laser diode 12 by the thus set current value is intermittently carried out at a predetermined cycle. Also, the duration of one irradiation pulse of this laser beam is sufficiently short that data cannot be recorded on the recording medium by the thus set current value.

Since the current value of the drive signal of from the laser diode 12 is set at the value in which the influence of the reflected-back light is made smallest, the distortion of the waveform of the reproduced signal, the occurrence of the mode-hopping noise by the reflected-back light and so on can be avoided, so that the data can be reproduced satisfactorily. Also, the heat generation in the laser diode 12 or the like can be suppressed by the intermittent irradiation of laser beam in pulses at short duration so that the arrangement of the driving circuit for driving the laser diode 12 can be simplified.

BEST MODE FOR CARRYING OUT THE INVENTION

An embodiment of a laser reproducing apparatus according to the present invention will hereinafter be described with reference to the attached drawings.

Figure 2:
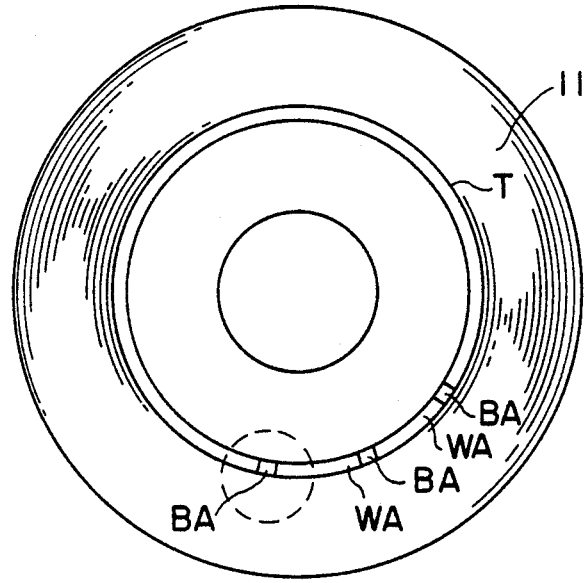
FIg. 2 is a plan view of a magneto-optical disk to be ready by the apparatus of FIG. 1.

A laser reproducing apparatus of this embodiment is a reproducing apparatus that reproduces data recorded on a magneto-optical disc. The condition in which data is recorded on the magneto-optical disc will be described first. As shown in FIG. 2, a plurality of tracks T are formed on a magneto-optical disc 11 along its circumferential direction. Servo areas BA are formed on the track T at predetermined intervals in advance by an embossing process.

Each servo area BA is followed by a data recording area WA in which data can be recorded.

Figure 3:
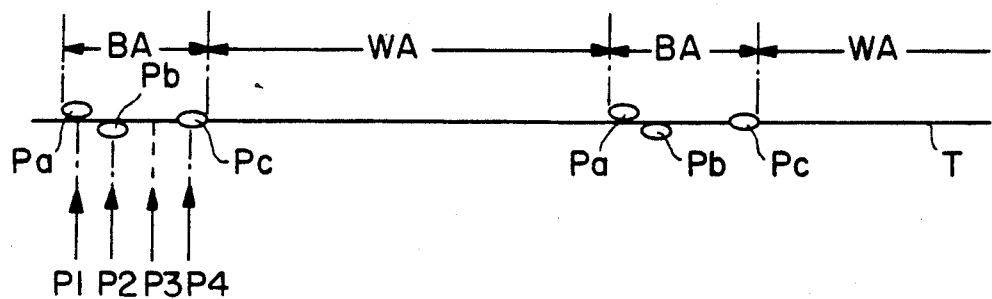
FIG. 3 is a plan view of a portion of a track T on the magneto-optical disk of FIG. 2.

In the servo area BA, pits Pa, Pb and Pc are, formed in advance by a concave and convex embosseing process as shown in FIG. 3. Upon reproduction, a clock signal for a tracking control signal reference and a focus control signal are generated by detecting the pits Pa, Pb and Pc and the mirror surface portion in which these pits are not formed by sampling pulses P1, P2, P3 and P4.

Figure 1:
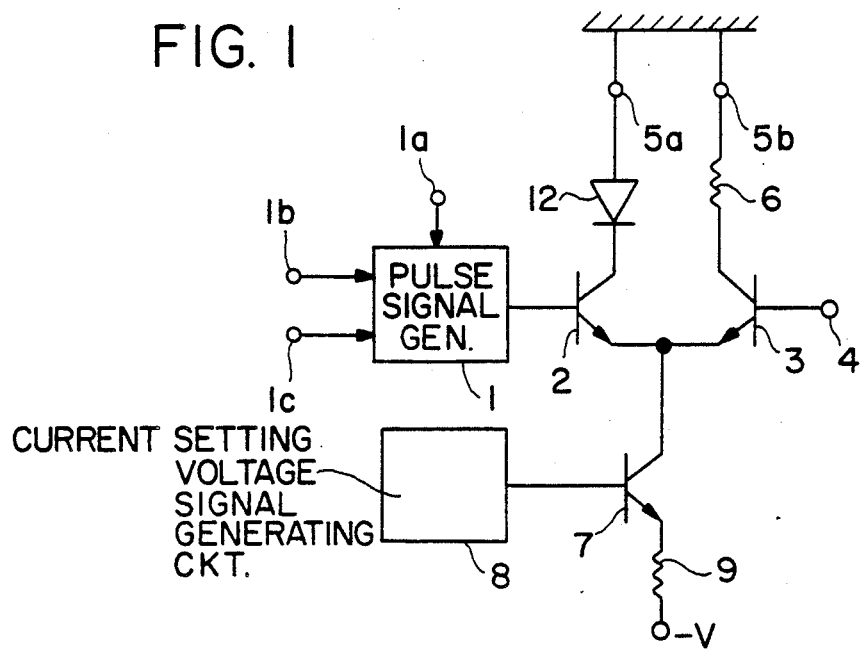
FIG. 1 is a construction diagram showing an embodiment of a laser reproducing apparatus according to the present invention.

An arrangement of a reproducing apparatus for reproducing the thus made magneto-optical disc will be described next with reference to FIG. 1. FIG. 1 is a diagram showing an arrangement of a laser diode driving circuit that is connected to the laser diode 12 of the reproducing apparatus of this embodiment. The irradiation of the laser beam from this laser diode 12 is controlled by a pulse signal generator 1. Specifically, this pulse signal generator 1 is provided with a mode signal input terminal 1a, a clock signal input terminal 1b and a pulse width setting signal input terminal 1c, each being served as an input terminal. The pulse signal derived from this pulse signal generator 1 is supplied to the base of a first NPN transistor 2. The emitter of the first transistor 2 is connected to the emitter of a second NPN transistor 3, and the base of the second transistor 3 is connected to a reference voltage signal supply terminal 4. The collectors of the first and second transistors 2 and 3 are respectively connected to one ends of the laser diode 12 and a resistor 6, while the other ends of the laser diode 12 and the resistor 6 are connected to ground terminals 5a and 5b of the power supply terminals. Then, the emitters of the first and second transistors 2 and 3 are connected to the collector of a third NPN transistor 7, and the base of the third transistor 7 is connected to a current setting voltage signal generating circuit 8. The emitter of the third transistor 7 is connected through a resistor 9 to a negative voltage source −V.

Figure 4:
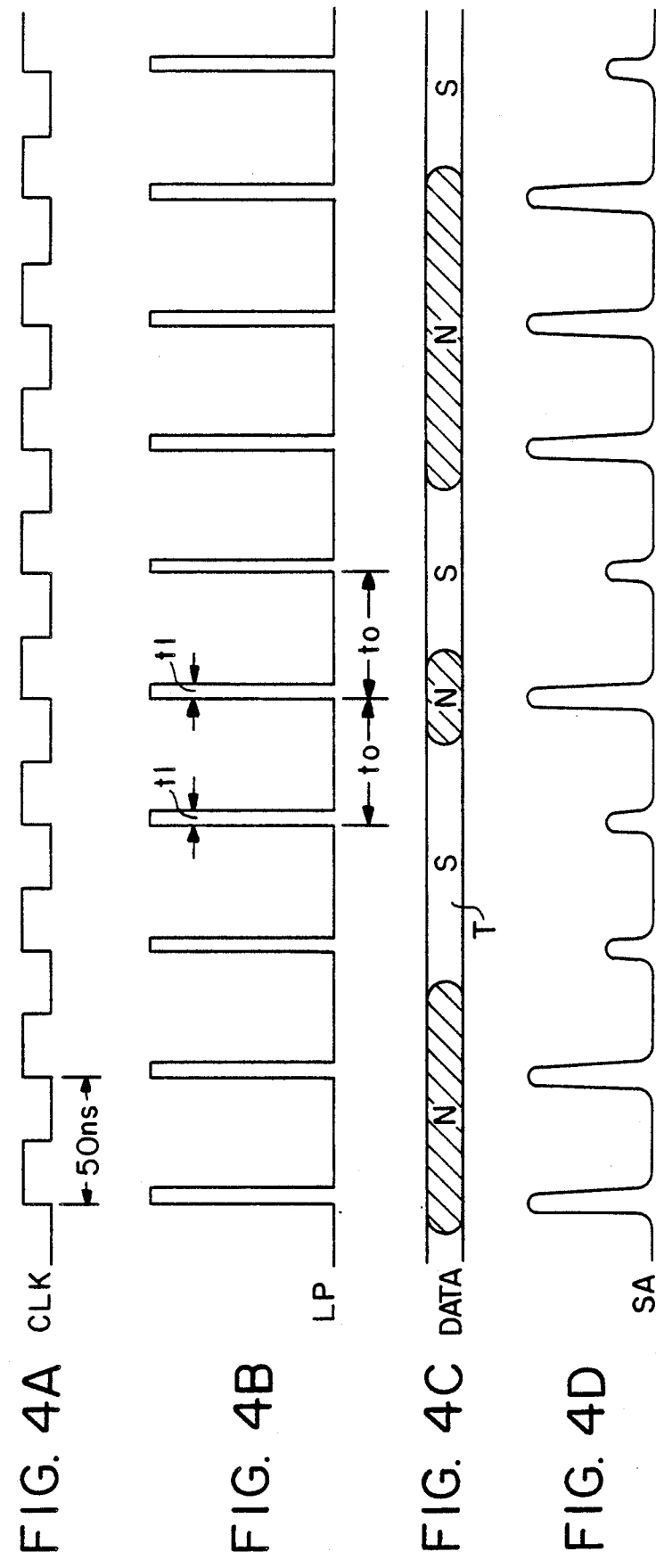
FIGS. 4A to 4D are waveform diagrams for assistance in describing the operation of the circuit of FIG. 1.

In this way, the circuit for driving the laser diode 12 is constructed, in which the irradiation of the laser beam from this laser diode 12 is performed in sync with the pulse signal derived from the pulse signal generator 1. This pulse signal generator 1 receives at its input terminal 1a a mode signal by which the three irradiation modes may be selected i.e. writing the data in the magneto-optical disc, erasing the data and reading the data from the magneto-optical disc. This pulse signal generator also receives at its clock signal input terminal 1b a clock signal CLK having a cycle of, for example, 50 ns as shown in FIG. 4A. In this embodiment, when data is read out from the magneto-optical disc, or the data is reproduced, on the basis of the pulse width setting signal supplied to the input terminal 1c, the pulse signal generator 1 produces a pulse signal LP shown in FIG. 4B. This pulse signal LP is a signal of period $t_0$ (50 ns) which is synchronized with the clock signal CLK having a cycle of 50 ns and is delivered as a pulse signal having a pulse width $t_1$ during the cycle period $t_0$. When the pulse signal having the pulse width $t_1$ is produced, the first transistor 2 is turned ON so that the laser beam is irradiated from the laser diode 12 thereby carrying out the intermittent irradiation by the laser beam having the pulse width $t_1$ at every cycle period $t_0$. The current value at that time is determined by the voltage signal derived from the current setting voltage signal generating circuit 8.

Figure 5:
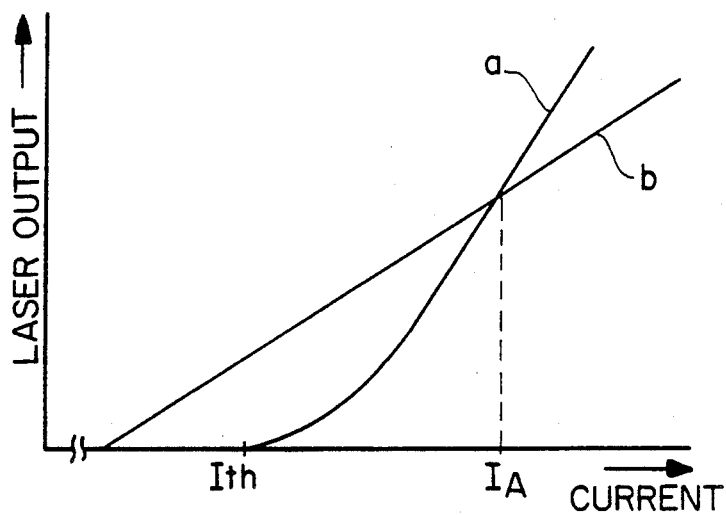
FIG. 5 is a graph of the laser output versus driving current depending upon whether the beam is reflected back to the laser diode.
Figure 7:
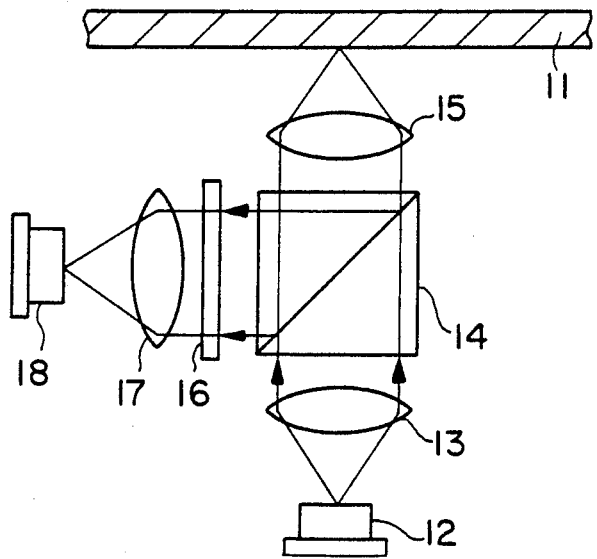
FIG. 7 is a schematic view of a laser diode and optical pick up such as that used in the present invention.

The thus set current value is determined by the output characteristic of the laser beam when it is subjected to reflected-back light in this embodiment. That is, the reflected-back light from the magneto-optical disc 11 is returned to the laser beam outputting portion of the laser diode 12 by the use of the pickup portion shown in FIG. 7. This reflected-back light, when it occurs, causes the output of laser beam to be changed. FIG. 5 is a graph showing the when the driving current the output of the laser beam is changed and depending upon whether the beam is reflected back. As shown in this graph, as compared with an output characteristic a of the laser diode 12 under the assumption that no reflected-back light exists, an output characteristic b of the same laser diode 12 containing the influence of the reflected-back light is higher up to a current value $I_A$. If the current exceeds this current value $I_A$, the output characteristic a without the reflected-back light exceeds the output characteristic b with the reflected-back light. The phenomenon in which the laser output is changed by the reflected-back light is referred to as a Self-coupled Optical Pick Up, or SCOP.

When the SCOP phenomenon occurs due to the reflected-back light, the distortion in the waveform of the reproduced signal distorts the reading operation of data. However, there is no influence of the reflected-back light near the current value $I_A$. Thus, when the value of current supplied to the laser diode 12 is set near the current value $I_A$, a laser beam with a small waveform distortion in the reproduced signal is irradiated on the magneto-optical disc. This current value $I_A$ is determined on the basis of the characteristic of the semiconductor laser element itself. The current value $I_A$ of the laser diode 12 in this embodiment is 100 mA. For this reason, in the case of this embodiment, the value of the current supplied to the laser diode 12 when the above-mentioned pulse signal LP is produced is selected to be 100 mA, while if the above-mentioned pulse signal LP is not produced, the above current value is selected to be 0 mA.

The laser beam output when the laser diode is supplied with the current of 100 mA for reproducing data from the magneto-optical disc is so high that continuous irradiation would cause the data recorded in the magneto-optical disc to be erased. Consequently, in the case of this embodiment, the pulse width $t_1$ of the pulse signal LP (FIG. 4B) which enables the above-mentioned intermittent irradiation to be without erasing the data performed is selected to be 5 ns. Accordingly, the drive current having the current value $I_A$ is flowed through the laser diode 12 during the period of 5 ns, while no drive current is flowed therethrough during the period of 45 ns. With a duration of the irradiation of 5 ns, the recorded data or the like is not erased and the data can be read out satisfactorily. It is desired that a ratio between the period $t_1$ in which the drive current of the current value $I_A$ is flowed and a period $(t_0 - t_1)$ in which no drive current is flowed is selected as $$\frac{t_1}{t_0 - t_1} \leq \frac{1}{3}.$$

This ratio is determined on the basis of the characteristics, such as reflectivity or the like, of the magneto-optical disc. For example, when data is recorded in the track T of the magneto-optical disc by the change of the magnetization direction as shown in FIG. 4C, a photo-detecting signal $S_A$ corresponding to the reflected light and incident on the light receiving element 18 of the optical pickup in the example of FIG. 7 becomes a signal corresponding to the recorded data as shown in FIG. 4D, thus carrying out the reading of data.

The noise level of the thus read signal can be suppressed to be low. In other words, since the level of the noise contained in the photo-detecting signal is constant regardless of the level of the photo-detecting signal, the relative noise level is lowered by using a photo-detecting signal whose level is made high by the above-mentioned large current, thus reproducing the data satisfactorily.

In this embodiment, the value of the drive current supplied to the laser diode 12 is selected so as to avoid the influence of the reflected-back light so that the waveform of the reproduced signal can be prevented from being distorted substantially. Further, although the cycle is 50 ns, that is, a relatively low frequency of 20 MHz from a frequency standpoint, the pulse width of the laser emission is selected to be 5 ns. Thus, the mode-hopping noise can be avoided substantially and hence, from this viewpoint, the data can be reproduced satisfactorily. In addition, since the influence of the reflected-back light is removed by the selection of the current value, a circuit and a power source for superimposing a high frequency signal are not needed, unlike the prior art, thus simplifying the circuit arrangement more. At the same time, the power consumption can be reduced. Also, since the influence of the reflected-back light can be removed, even a recording medium such as a CD-ROM or the like made of an aluminum type material or the like and which reflects morea light can be reproduced satisfactorily by the pickup of the usual arrangement shown in FIG. 7.

Figure 6:
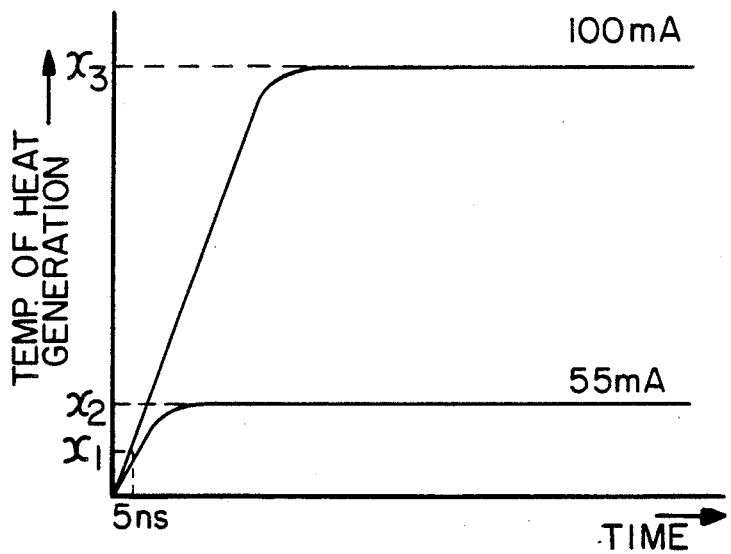
FIG. 6 is a graph of the temperature generated by the laser diode versus time.

Further, the data is read out intermittently as described above, so that the heat generation of the laser diode 12 is reduced. Specifically, FIG. 6 is a graph illustrating the heat-generating condition of the laser diode. In the semiconductor laser, the temperature becomes certain after the elapse of a constant time corresponding to the irradiation output. However, the temperature does not reach a maximum by irradiation of for time period as short as 5 ns. The temperature $x_1$ generated at a current value of 100 mA and a time period of 5 ns is considerably reduced as compared with the temperature $x_2$ generated by continuous irradiation at a current value of 55 mA and the temperature $x_3$ generated by continuous irradiation at a current value of 100 mA. Thus, it becomes unnecessary to provide a circuit which can correct the fluctuation in the output of the laser beam due to the fluctuation of the operating point (Ith in FIG. 5) brought about by the heat generation of the laser diode 12. Therefore, the circuit arrangement can be simplified more.

The light emission frequency $1/t_0$, which is determined by the light emission interval $t_0$ of the laser beam, may be, when the reproduced signal is integrated and processed, more than twice the spatial frequency of the reproducing system that reproduces the recorded data formed on the recording medium. When the sample is read out, the light emission frequency may be equal to the spatial frequency of the reproducing system of the recorded data and it may fall in a range of, for example, about several MHz to several 10s of MHz.

While the present invention is described as the reproducing apparatus for a magneto-optical disc in the above-mentioned embodiment, the present invention can be applied to a reproducing apparatus that reproduces may other recording medium, such as an optical disc, an optical card and the like, utilizing a laser beam.

Further, it is needless to say that the present invention is not limited to the above-mentioned embodiment but can take various modifications thereof without departing from the gist of the present invention.

We claim:

1. A laser reproducing apparatus for reproducing data recorded on a recording medium by the irradiation of a laser beam from a laser diode, in which the laser diode is activated by a drive current, and light from the laser diode is reflected back from the recording medium into the laser diode, comprising:

means for setting the drive current for activating said laser diode near a value at which the laser beam is altered the least by the reflected-back light; and means for pulsing the irradiation of the recording medium by the laser beam from said laser diode at set current value intermittently at a predetermined cycle.

2. A laser reproducing apparatus according to claim 1, further comprising means for setting the duration of each pulse of said laser beam short enough that a signal recorded on said recording medium is not affected at said current value.

3. A laser reproducing apparatus according to claim 1, wherein the ratio between the pulse duration in which said laser diode generates a laser beam and the duration in which said laser diode does not generate a laser beam is less than ½.

4. A laser reproducing apparatus according to claim 3, further comprising means for setting the drive current to zero in between pulses of the laser beam.

5. A laser reproducing apparatus according to claim 1, wherein the light emission frequency of said laser beam $1/t_0$ determined by the light emission interval $t_0$ of said predetermined cycle is more than twice the spatial frequency of the reproducing system when recorded data is integrated and read.

6. A laser reproducing apparatus according to claim 1, wherein the light emission frequency of said laser beam $1/t_0$ determined by the light emission interval $t_0$ of said predetermined cycle is equal to the spatial frequency of the reproducing system when a sample recorded data is read.

7. A laser reproducing apparatus according to claim 1, wherein the ratio between the pulse duration in which said laser diode generates a laser beam and the duration of the predetermined cycle is less than ¼.

8. A method for reproducing data recorded on a recording medium by use of a laser reproducing apparatus in which the laser diode is activated by a drive current, and light from the laser diode is reflected back from the recording medium into the laser diode, comprising:

setting the drive current for activating the laser diode to a value at which alteration of the laser beam output from the diode due to the light reflected back from the recording medium is near a minimum; and pulsing said drive current at said value at predetermined fixed intervals such that the laser beam is pulsed at said intervals.

9. A method for reproducing data according to claim 8, further comprising the step of setting the duration of each pulse to be short enough that the data recorded on the recording medium is not altered by the laser beam generated by said drive current.

10. A method for reproducing data according to claim 8, wherein the ratio of the pulse duration to the interval duration is less than or equal to $\frac{1}{4}$.

11. A method for reproducing data according to claim 10, further comprising the step of setting the drive current to zero during the time between consecutive pulses of the drive current.

12. A method for reproducing data according to claim 8, wherein the light emission frequency of said laser beam $1/t_0$ determined by the period $t_0$ of the fixed intervals is more than twice the spatial frequency of the reproducing system when recorded data is integrated and read.

13. A method for reproducing data according to claim 8, wherein the light emission frequency of said laser beam $1/t_0$ determined by the period $t_0$ of the fixed intervals is equal to the spatial frequency of the reproducing system when a sample data is read.

* * * * *